US009886105B2

(12) United States Patent
McCaughan et al.

(10) Patent No.: US 9,886,105 B2
(45) Date of Patent: Feb. 6, 2018

(54) TOUCH SENSING SYSTEMS

(71) Applicant: Promethean Limited, Blackburn, Lancashire (GB)

(72) Inventors: Gareth John McCaughan, Cottenham (GB); Paul Richard Routley, Cambridge (GB); Euan Christopher Smith, Longstanton (GB); Lilian Lacoste, Gan (FR); Julian Hall, Cambridge (GB); Adrian James Cable, Cambridge (GB)

(73) Assignee: Promethean Limited (GB)

( * ) Notice: Subject to any disclaimer, the term of this patent is extended or adjusted under 35 U.S.C. 154(b) by 423 days.

(21) Appl. No.: 14/578,285

(22) Filed: Dec. 19, 2014

(65) Prior Publication Data

US 2015/0177861 A1    Jun. 25, 2015

(30) Foreign Application Priority Data

Dec. 23, 2013  (GB) .................................. 1322853.1

(51) Int. Cl.
*G06F 3/041*  (2006.01)
*G06F 3/0354* (2013.01)
*G06F 3/03*   (2006.01)
*G06F 3/042*  (2006.01)

(52) U.S. Cl.
CPC ........ *G06F 3/03545* (2013.01); *G06F 3/0304* (2013.01); *G06F 3/0426* (2013.01)

(58) Field of Classification Search
None
See application file for complete search history.

(56) References Cited

U.S. PATENT DOCUMENTS

| 5,623,129 | A  |   | 4/1997  | Mallicoat |
|-----------|----|---|---------|-----------|
| 7,519,223 | B2 | * | 4/2009  | Dehlin ................. G06F 3/0354 345/173 |
| 2009/0116742 | A1 | * | 5/2009 | Nishihara ............ G06F 3/0425 382/173 |
| 2011/0291988 | A1 |   | 12/2011 | Bamji et al. |

(Continued)

FOREIGN PATENT DOCUMENTS

WO   WO 2013/108031   7/2013
WO      2013/135575   9/2013

OTHER PUBLICATIONS

Search Report, dated Jun. 11, 2015, from corresponding United Kingdom Application Serial No. GB1322853.1.

*Primary Examiner* — Alexander Eisen
*Assistant Examiner* — Kebede Teshome
(74) *Attorney, Agent, or Firm* — Brient Globerman, LLC; Kyle M. Globerman

(57) ABSTRACT

We describe a touch sensing system projecting light defining a touch sheet above a surface and a camera to capture a touch image of light scattered by a pen intersecting the touch sheet. A signal processor identifies a lateral location of the pen. The pen includes a light source to provide a light signal, and the system also includes two photodiodes to detect the signal from the pen. The touch detection is augmented by modelling the signals received at the photodiodes, dependent on the distance and angle of a pen, and using this to derive a probability of the observed received signals given the pen location determined from the touch sheet. This information can be used, for example, to allocate identities to the pens.

20 Claims, 10 Drawing Sheets

(56) References Cited

U.S. PATENT DOCUMENTS

| | | | |
|---|---|---|---|
| 2011/1029198 | | 12/2011 | Bamji |
| 2014/0149898 A1* | 5/2014 | DeLuca | G06F 3/0488 |
| | | | 715/764 |
| 2014/0379287 A1 | 12/2014 | Luong | |
| 2016/0109984 A1* | 4/2016 | Slezinskyy | G06F 3/0488 |
| | | | 345/174 |
| 2016/0378257 A1* | 12/2016 | Oakley | G06F 3/03 |
| | | | 345/175 |

* cited by examiner

SEEN BY
PHOTODETECTORS

|  | m | n |
|---|---|---|
| n (SEEN BY TOUCH SHEET) | COSTS MATCHED | COSTS UNMATCHED |
| m | COSTS UNMATCHED | 0 |

Figure 6c

TOUCH SENSING SYSTEMS

CROSS REFERENCE TO RELATED APPLICATION

This application claims priority to GB Application No. GB1322853.1 entitled "Touch Sensing Systems" and filed Dec. 23, 2013. The entirety of the aforementioned reference is incorporated herein by reference for all purposes.

FIELD OF THE INVENTION

This invention relates to pen-based touch sensing systems and methods which, in embodiments, can be used to add touch-sensing functionality to a whiteboard, display screen, and the like.

BACKGROUND OF THE INVENTION

We have previously described a range of improvements in touch sensing systems of the type which project a sheet of light just above a surface or display, for example to provide an electronic whiteboard. Examples of such improvements can be found in our earlier filed WO2013/144599.

We now describe further improvements to pen-based touch systems which are particularly, but not exclusively applicable to 'sheet of light' touch sensing systems. In the later description we refer to pens but the skilled person will appreciate that in this specification 'pen' is to be interpreted broadly covering other hand held devices usable for indicating a position on a surface such as a whiteboard including, for example, wands and the like.

A sheet of light based touch sensing system typically uses a camera to capture an image of light scattered by a pen intersecting the sheet. This imposes an image capture and processing delay greater than the shutter speed, for example greater than 1/60 of a second. In addition, for this type of system a pen is invisible if it is hovering just above the sheet of light. A similar effect can occur, for example, when writing, when the scattered light from a pen (the 'blob' in the image captured by a camera of the scattered light) disappears and reappears during the writing process. A touch detection system may incorporate a touch tracking process such as a tracking filter, and it would be useful for such a process to maintain an approximate location for a pen even when the pen was not breaking the light sheet.

Further issues arise when multiple pens are used simultaneously, and/or when one or more of the light scattering regions in a touch image is not a pen but a finger. More particularly, it is useful to be able to identify individual pens during use, in particular when intersecting the light sheet, that is when not 'hovering', so that different pens can be given different functions, for example different colors. We have previously described techniques which enable a user to 'write' on a touch sensitive surface with different color pens (ibid), but nonetheless improvements are desirable.

SUMMARY OF THE INVENTION

This invention relates to pen-based touch sensing systems and methods which, in embodiments, can be used to add touch-sensing functionality to a whiteboard, display screen, and the like.

BRIEF DESCRIPTION OF THE DRAWINGS

These and other aspects of the invention will now be further described, by way of example only, with reference to the accompanying figures in which:

FIGS. 6a to 6d show, respectively, a touch sensing system according to an embodiment of the invention combining a first, photo detector-based touch sensing system and a second, more accurate sheet of light-based touch sensing system, probability contours for the photo detector-based touch sensing system, a matrix of costs for assigning pens to locations from the sheet of light-based touch sensing system, and a block diagram of the touch sensing system of FIG. 6a.

DETAILED DESCRIPTION OF EMBODIMENTS

Figure 1A:
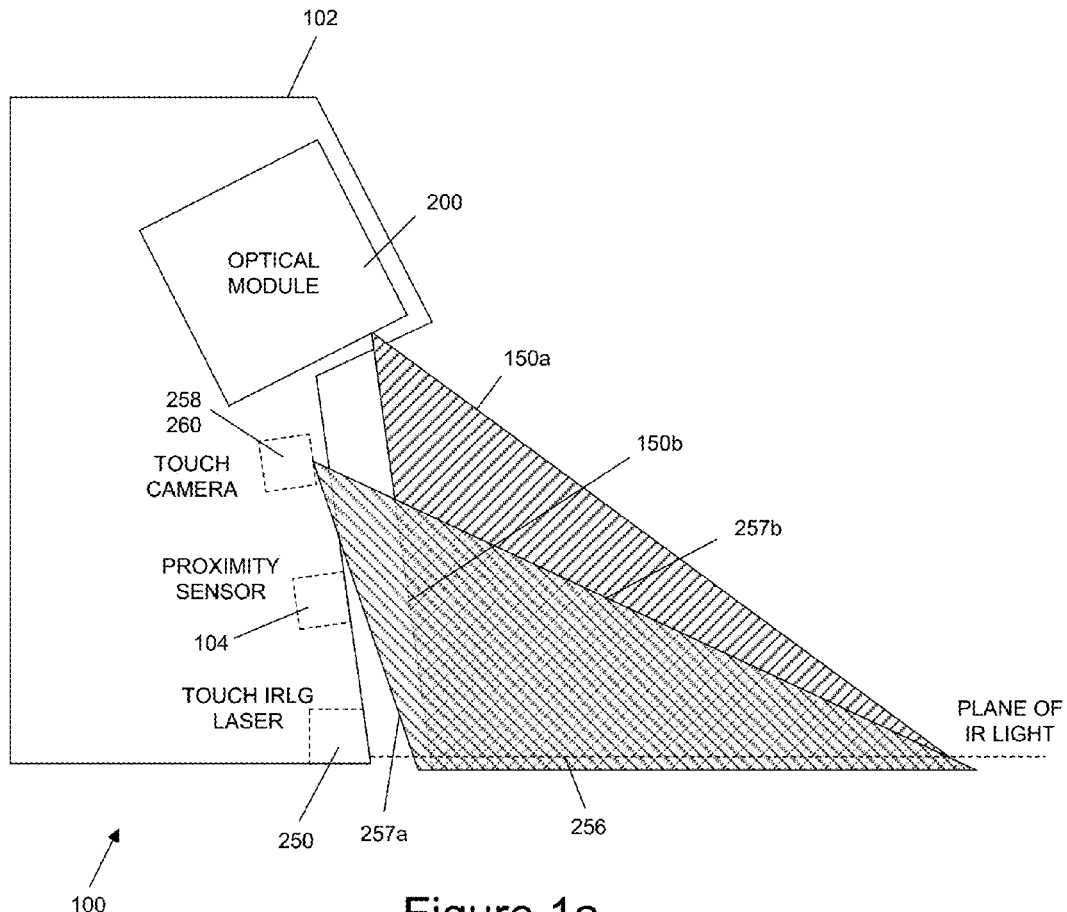
FIGS. 1a and 1b show, respectively, a vertical cross section view through an example touch sensitive image display device, and details of a sheet of light-based touch sensing system for the device.
Figure 1B:
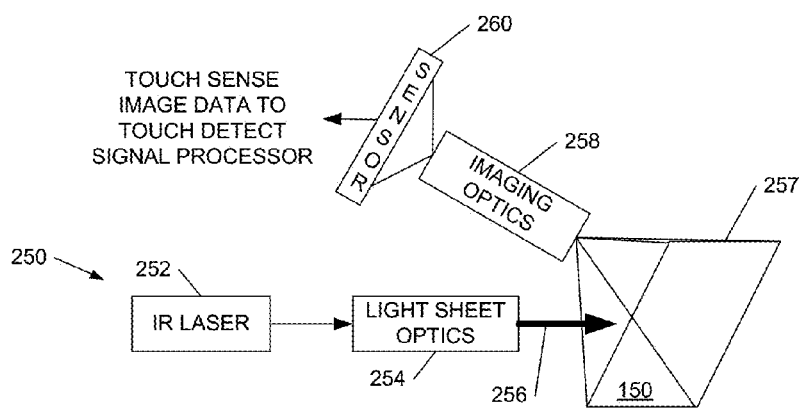
Figure 2A:
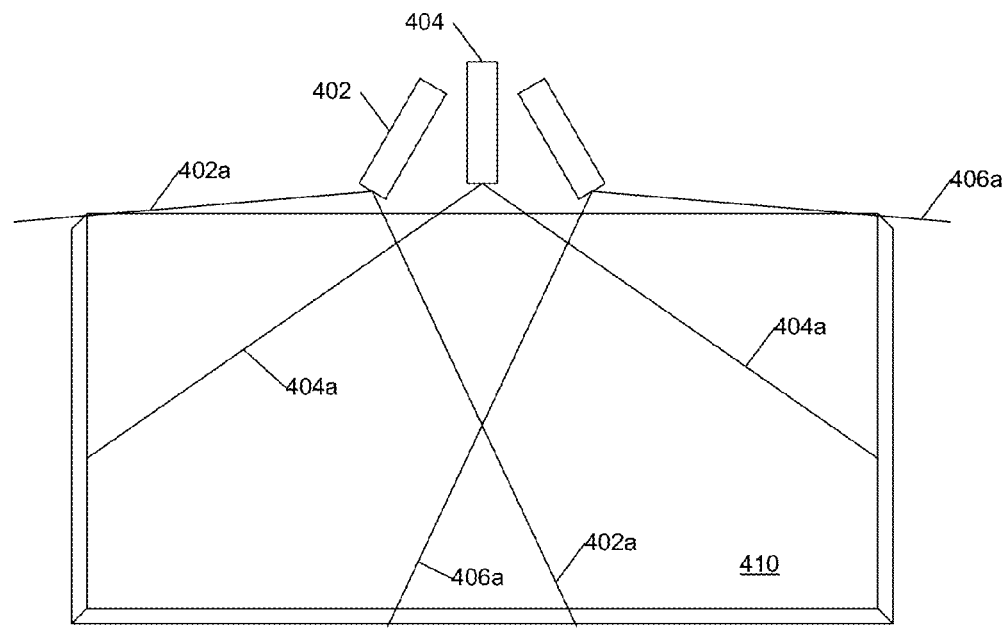
FIGS. 2a and 2b show, respectively, a plan view and a side view of an interactive whiteboard incorporating a touch sensitive image display.
Figure 2B:
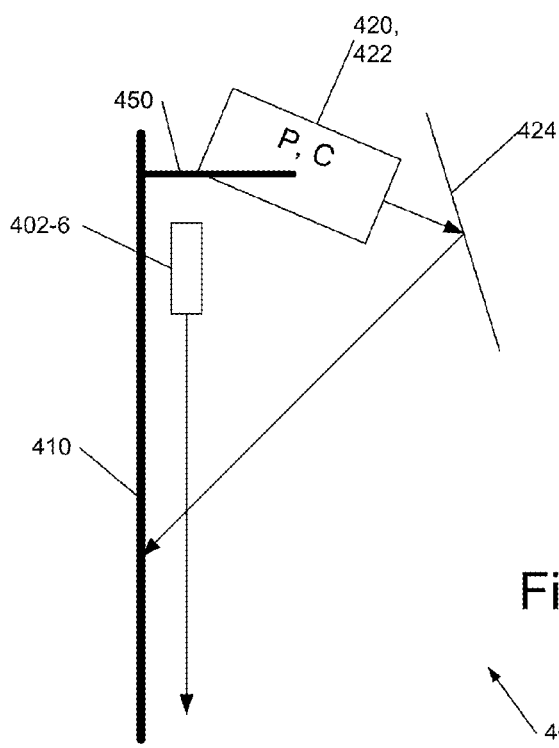

We have previously described touch sensing systems employing a plane or sheet of light, for example as shown in FIGS. 1 and 2. These techniques may be employed for detecting touches or objects proximate to a surface.

According to a first aspect of the invention there is provided a method of determining the location of a touch object in a touch sensing system, the method comprising: receiving first and second versions of a signal from said touch object at respective first and second detectors; determining a property of said touch object dependent on a probability of receiving first and second versions of said signal at said first and second detectors given a location of said touch object in a touch sensing region of said system, wherein said probability is dependent on a model of variation of predicted first and second versions of said signal received at said detectors with location of said touch object; and using said determined property of said touch object to determine a location of said touch object.

Broadly speaking, embodiments of the method use two or more detectors, in combination with a model of an expected signal at these detectors given a pen position, to determine a probability of an actual signal received at the detectors and/or a cost or reward value dependent on this probability. Such a model can be employed to determine an estimate of the location of the touch object (say, pen) and/or to assign an identity to the touch object based on its location. In this latter case the identity of the touch object may be known by some mechanism, for example a coded signal from the object, and the probability of the object being at a particular location can be employed to match or assign the identified object to a touch location from a second, more accurate touch sensing system, such as a sheet of light based system. In principle, however, such techniques may be applied to other systems, for example a scanning beam touch sensing system of the type described in our PCT/GB2013/052150.

In some embodiments of the method, therefore, the property of the touch object determined is a location, more particularly an approximate location, of the touch object. In other embodiments of the method an identity of the touch object is determined. These embodiments may be combined and thus, for example, the method may be employed to roughly locate when a pen is in hover before breaking a sheet of light (or during occlusion), and also to identify a pen when not in hover, by matching or associating the location of a region of scattered light in a captured touch image with a probability that a particular pen is at the corresponding location.

In some embodiments of the method the model of variation of the received signals comprises a product of a first function defining how the signal from a touch object falls off with distance from a detector, and an optional (but preferable) second function defining a variation of the received signal with the angle of the touch object to a fiducial direction defined by the detector (sensor), for example an optical axis of the sensor. Thus in embodiments the model comprises a function Predicted(x,y) dependent on $f_{dist}(d) \cdot f_{angle}(\varphi)$ where x and y define a 2D location in the touch sensing region, Predicted(x,y) is a predicted received version of said signal at one of the detectors, d is a distance from the touch object to the detector, $\varphi$ is an angle between a fiducial direction and a direction between the touch object and the detector, and $f_{dist}$ and $f_{angle}$ are respective sensor-signal distance and sensor-signal angle modelling functions. However in other embodiments either $f_{dist}$ and $f_{angle}$ may be omitted. The skilled person will appreciate that in principle any number of detectors may be employed and embodiments may have three, four or more detectors.

Depending upon how the model is implemented, embodiments may also incorporate a factor relating to the gain of a detector (sensor). The skilled person will appreciate that, in principle, other factors may also be included, for example a factor dependent on the angle at which a pen is held to the sheet of light, a factor defining a rotational angle of the pen about its longitudinal axis, a factor dependent on the strength of signal emitted by the pen and so forth. The skilled person will also appreciate that the model need not be a product of separate factors in this way, as the effect of distance and angle on detector response need not be independent.

As previously mentioned, in embodiments of the method a second, more accurate touch sensing system, in embodiments a sheet-of-light based touch sensing system, is employed to determine a second, accurate location of the touch objects, and the property of the touch object determined by the model-dependent probability comprises a first, reduced accuracy location for the touch object. This less accurate location may then be employed to augment the more accurate location.

In some embodiments the second, more accurate touch sensing system is a sheet-of-light based touch sensing system, imaging light scattered when the touch object intersects the sheet. In other embodiments the second, more accurate touch sensing system directly images light from the touch object to determine a location for the object without use of a touch sheet (of light). The light from the touch object may be from general illumination of the touch object by visible or invisible (e.g. infrared) light, the touch object may be an active touch object comprising a source of light, for example an active pen.

In such cases the method may be employed, for example to provide an approximate location when the object (pen) is lifted away from the sheet of light or occluded and/or a signal to facilitate object tracking. In principle, however, any type of touch sensing system may be employed as the second, more accurate touch sensing system.

In a particular embodiment, however, multiple touch objects, typically pens, are provided each identifiable by a back-channel from the object/pen to the detectors, for example by means of a frequency-coded identity signal. The second, typically sheet of light-based, touch sensing system provides locations for the pens, the detectors identify the pens, and the model can be used to determine, for each location from the sheet of light based system, the probability that a particular, identified pen is at that location. In practice rather than determine the probabilities per se a cost (or reward) function is determined dependent on the relevant probability.

In embodiments the identification of a region of scattered light in a captured touch sense image with a pen detected by the detectors is not performed by directly matching locations, but is instead performed by allocating a cost (or reward) to each pen for each 'blob' in the captured touch image. To facilitate handling the probabilities preferably a logarithm of the probability is employed so that sums of logarithms correspond to products of probabilities and hence to probabilities of conjunctions; where a cost is represented a negative log probability may be used.

In some embodiments of the method/system described above (and in later described aspects of the invention) the detectors are photo-detectors and the detected signal is a light signal. However the skilled person will appreciate that the techniques we describe are not limited to photo-detectors and may in principle be used with any type of detector/signal including, but not limited to: RF (radio frequency), acoustic, near field (magnetic signalling/induction coil sensor), and the like. In particular an RF-based approach potentially offers the ability to operate at lower powers, which can be advantageous.

The invention further provides processor control code to implement the above-described methods, for example on a general purpose computer system or on a digital signal processor (DSP). The code is provided on a non-transitory physical data carrier such as a disk, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, or code for a hardware description language. As the skilled person will appreciate such code and/or data may be distributed between a plurality of coupled components in communication with one another.

In a related aspect the invention provides a touch sensing system for determining the location of a touch object, the system comprising: first and second detectors to receive first and second versions of a signal from said touch object; and a processor configured to: determine a property of said touch object dependent on a probability of receiving first and second versions of said signal at said first and second detectors given a location of said touch object in a touch sensing region of said system, wherein said probability is dependent on a model of variation of predicted first and second versions of said signal received at said detectors with location of said touch object; and use said determined property of said touch object to determine a location of said touch object.

As previously described, in embodiments the processor is further configured to disambiguate identities of touch objects located by the second touch sensing system using the probabilities determined from the model for these locations. This disambiguation may comprise distinguishing between multiple objects seen simultaneously by the second touch sensing system but, more preferably, comprises determining specific, separate identities for the touch objects seen, at least so far as the captured data allows.

In a further related aspect the invention provides a touch sensing system, the system comprising: a touch sensor optical system to project light defining a touch sheet above a surface; at least one pen to provide a pen signal; a camera directed to capture a touch sense image from a region including at least a portion of said touch sheet, said touch sense image comprising light scattered from said touch sheet by a pen approaching said surface; a signal processor coupled to said camera, to process a said touch sense image from said camera to identify a lateral location of said pen on said surface and provide a touch detection signal for said pen including a location of said pen; wherein the system further comprising at least two detectors, coupled to said signal processor, to detect said pen signal from said at least one pen; and wherein said signal processor is further configured to process detected pen signals from said detectors to augment said touch detection signal.

The pen providing the touch signal may be either active (including a light or other signal source) or passive (for example, scattering light from the touch sheet). In embodiments the detectors are located at the edge of the touch sensing region, for example spaced apart along one edge of the touch sensing region, conveniently together at the top of an electronic whiteboard (there is no need for the detectors to be, say, at the corners of the touch sensing region). The processing of the signals from the detectors may be employed to augment the touch detection signal by identifying one or more pens intersecting the light sheet and/or by determining an approximate location of one or more pens even when not intersecting the light sheet.

Some implementations use the previously described model-derived probability-based method for locating a pen. Thus in some implementations an assignment between a pen (identity) and a touch location identified from the camera image is made dependent on a probability determined from one or both of a common mode signal and a differential mode signal from the detectors. More particularly the model may predict a common mode signal seen by the detectors, dependent on a sum of the signals from the detectors—which will gradually decrease with distance of a pen from the detectors. The model may also predict a differential signal from the detectors, dependent on a difference between the signals from the detectors—which typically changes more rapidly with pen position relative to the detectors. In embodiments the difference between the measured signals from the detectors and the predicted signals from the detectors are determined, for either or both of common mode and differential mode. In embodiments the model/prediction takes into account the gain of the electronics processing the signals from the detectors, though this is not essential.

Again, in some embodiments a weighted combination of values dependent on these common mode and differential mode differences is determined, preferably weighting the differential mode difference more than the common mode difference as this accords with the expected variation. Then a probability of the (weighted) difference may be determined given a putative location for the pen although in embodiments, rather than determine the probability explicitly, a cost (or reward) dependent on this probability is determined. This probability (or cost/reward) effectively defines the probability of the observed signals from the pen given the postulated location of the pen from the sheet of light (or other) touch sensing system.

Such a probability (or cost/reward) effectively takes into account various sources of error, such as measurement noise, variability in the manner in which a pen is held, inaccuracies in the model and the like. For example for a pen whose emission is not radially symmetric about the pen's axis (e.g. a pen with an LED ring emitter), twisting the pen (rotation about its longitudinal axis) can vary the received signal substantially, but in a common mode—which is preferably significantly less weighted than the differential mode signal. The same applies to overall change in LED brightness, for example due to a declining battery. In principle, however, as previously mentioned such effects could be modelled for more accurate prediction and/or to determine additional property data, such as pen twist (rotation).

In some cases, the model employs variables which have a generally Gaussian distribution, so that their probability may be modelled by an exponential function. This facilitates using a negative log probability in comparing costs for allocating pens to touch locations. In one approach, for example, a matrix of costs is constructed with, say, rows defining touch detection locations from the sheet of light touch sensing system and columns defining costs (probabilities) associated with assigning each pen to the respective location. A match between the touch locations from a captured image and a pen may then be performed by picking one column (pen) for each row (location) to minimize a cost-related parameter, for example a total cost of the collection of pen-location assignments. Optionally such a matching procedure can take into account additional factors, for example increasing a match probability (decreasing a cost) based upon a relative timing of detection by the detectors and the second touch sensing system—if the times of detection are similar then it is more likely that the pen and location match.

Similarly the matching procedure may be adapted to better distinguish between a pen and a non-pen, e.g. finger, object detected by the second touch sensing system, for example the sheet of light system. A non-pen may be distinguished where a scattered light region (blob) is seen in a captured touch sense image but where no (likely) signal is seen from the detectors—at that location there is a low probability that any pen matches. Thus, for example, where a location has less than a threshold probability or cost/reward from any pen, the location may be allocated to a non-pen object such as a finger. Conversely, where a probability/cost/reward is greater than a threshold for a location from the second touch sensing system, that location may be assigned to a pen. In principle other heuristics may also be employed, for example taking account of an expected pattern of lift-off a pen partly or wholly away from a touch surface during writing, and so forth.

In one particular application a system/method of the type described above may be incorporated into an interactive electronic whiteboard, but the skilled person will appreciate that many other applications may also be envisaged.

FIG. 1 shows an example touch sensitive image projection device 100 comprising an image projection module 200 and a touch sensing system 250, 258, 260 in a housing 102. A proximity sensor 104 may be employed to selectively power-up the device on detection of proximity of a user to the device. The image projection module 200 is configured to project downwards and outwards onto a flat surface such as a tabletop; boundaries of the light forming the displayed image 150 are indicated by lines 150a, b. Projection of the image may be accomplished by means including, but not limited to, digital micro mirror displays and liquid-crystal displays, including holographic projectors as described in our previously filed patent applications.

The touch sensing system 250, 258, 260 comprises an infrared laser illumination system 250 configured to project a sheet of infrared light 256 (e.g. 905 nm) just above the surface of the displayed image 150 (for example ~1 mm above, although in principle the displayed image could be distant from the touch sensing surface). The laser illumination system 250 may comprise an IR LED or laser 252, collimated then expanded in one direction by light sheet optics 254 such as a cylindrical lens. The skilled person will appreciate that there are many ways in which a touch sheet may be generated additionally/instead of a cylindrical lens including, for example, a lenticular array or diffractive diffuser.

A CMOS imaging sensor (touch camera) 260 is provided with an IR-pass lens 258 (and preferably with a filter to reject light outside a band around the touch sheet wavelength). This captures light scattered by touching the displayed image 150, with an object such as a finger or pen, through the sheet of infrared light 256 (the boundaries of the CMOS imaging sensor field of view are indicated by lines 257, 257a, b). The touch camera 260 provides an output to touch detect signal processing circuitry as described further later. These techniques may be employed with any type of image projection system.

FIG. 2 shows plan and side views of an example interactive whiteboard touch sensitive image display device 400 incorporating such a system. In the illustrated example there are three IR fan sources 402, 404, 406, each providing a respective light fan 402a, 404a, 406a spanning approximately 120° together generating a single, continuous sheet of light just above display area 410. The fans overlap on the display area (which is economical as shadowing is most likely in the central region of the display area). Typically such a display area 410 may be of order 1 m by 2 m. The side view of the system illustrates a combined projector 420 and touch image capture camera 422 either aligned side-by-side or sharing a portion of the projection optics. The optical path between the projector/camera and display area is folded by a mirror 424. The sheet of light generated by fans 402a, 404a, 406a is preferably close to the display area, for example less than 1 cm or 0.5 cm above the display area. However the camera and projector 422, 420 are supported on a support 450 and may project light from a distance of up to around 0.5 m from the display area.

Example Touch Sensing System

Figure 3A:
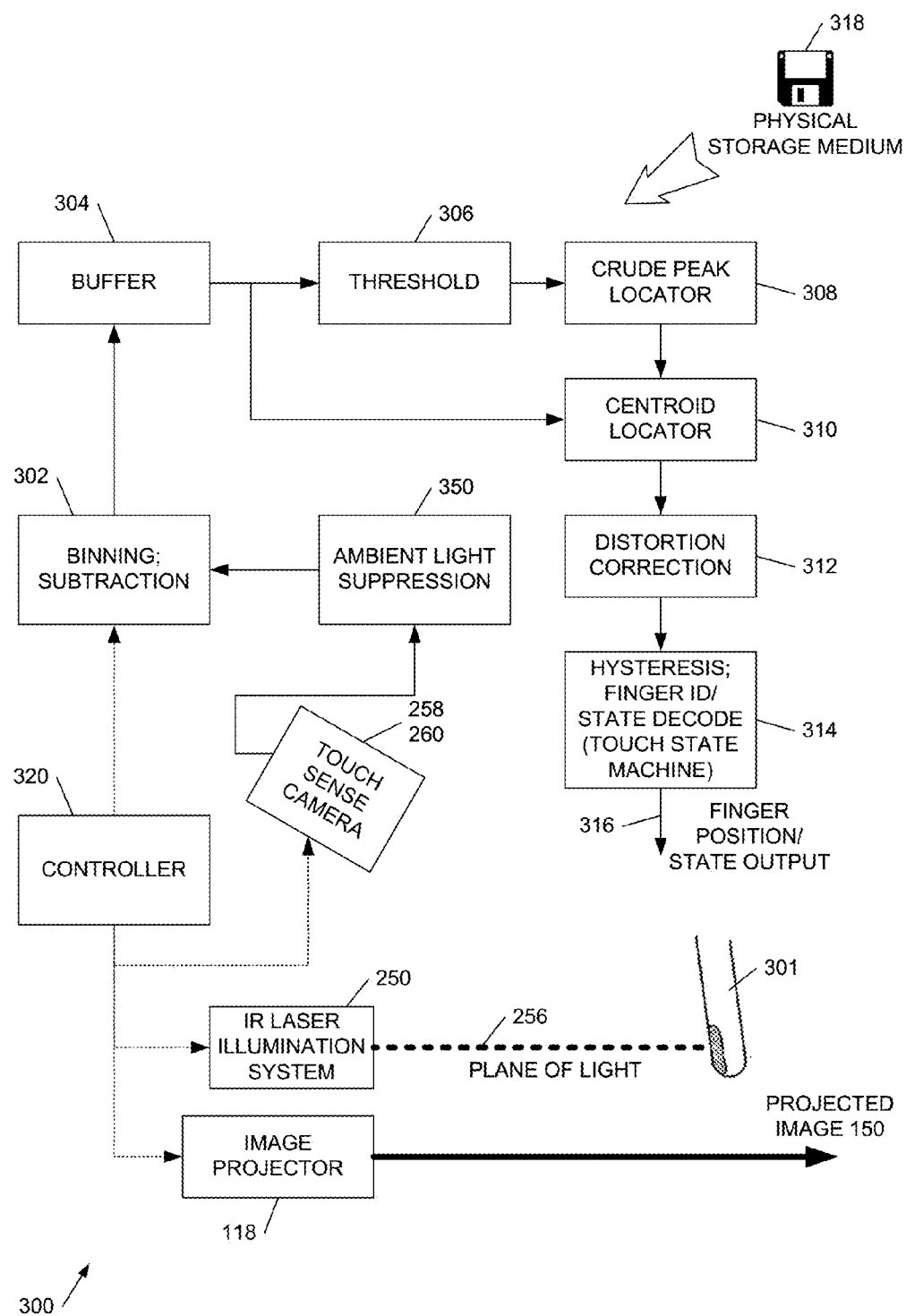
FIGS. 3a to 3c show, respectively, an embodiment of a touch sensitive image display device, use of a crude peak locator to find finger centroids, and the resulting finger locations.

Referring now to FIG. 3a, this shows an embodiment of a touch sensitive image display device 300 according to an aspect of the invention. The system comprises an infra-red laser and optics 250 to generate a plane of light 256 viewed by a touch sense camera 258, 260 as previously described, the camera capturing the scattered light from one or more fingers 301 or other objects interacting with the plane of light. The system also includes an image projector 118, for example a holographic image projector, also as previously described.

In the arrangement of FIG. 3a a controller 320 controls the IR laser on and off, controls the acquisition of images by camera 260 and controls projector 118. In the illustrated example images are captured with the IR laser on and off in alternate frames and touch detection is then performed on the difference of these frames to subtract out any ambient infra-red. The image capture objects 258 preferably also include a notch filter at the laser wavelength which may be around 780-950 nm. Because of laser diode process variations and change of wavelength with temperature this notch may be relatively wide, for example of order 20 nm, and thus it is desirable to suppress the effects of any ambient IR, which in this embodiment may be accomplished by the subtraction of alternate frames. In the arrangement of FIG. 3a subtraction is performed by module 302 which, in embodiments, is implemented in hardware (an FPGA).

In embodiments module 302 also performs binning of the camera pixels, for example down to approximately 80 by 50 pixels. This helps reduce the subsequent processing power/memory requirements and is described in more detail later. However such binning is optional, depending upon the processing power available, and even where processing power/memory is limited there are other options, as described further later.

Following the binning and subtraction the captured image data is loaded into a buffer 304 for subsequent processing to identify the position of a finger or, in a multi-touch system, fingers.

Because the camera 260 is directed down towards the plane of light at an angle it can be desirable to provide a greater exposure time for portions of the captured image further from the device than for those nearer the device. This can be achieved, for example, with a rolling shutter device, under control of controller 320 setting appropriate camera registers.

Depending upon the processing of the captured touch sense images and/or the brightness of the laser illumination system, differencing alternate frames may not be necessary (for example, where 'finger shape' is detected). However where subtraction takes place the camera should have a gamma of substantial unity so that subtraction is performed with a linear signal.

Various different techniques for locating candidate finger/object touch positions will be described. In the illustrated example, however, an approach is employed which detects intensity peaks in the image and then employs a centroid finder to locate candidate finger positions. In embodiments this is performed in software. Processor control code and/or data to implement the aforementioned FPGA and/or software modules shown in FIG. 3 (and also to implement the modules described later with reference to FIG. 5) may be provided on a disk 318 or another physical storage medium.

Thus in embodiments module 306 performs thresholding on a captured image and, in embodiments, this is also employed for image clipping or cropping to define a touch sensitive region. Optionally some image scaling may also be performed in this module. Then a crude peak locator 308 is applied to the thresholded image to identify, approximately, regions in which a finger/object is potentially present.

Figure 3B:
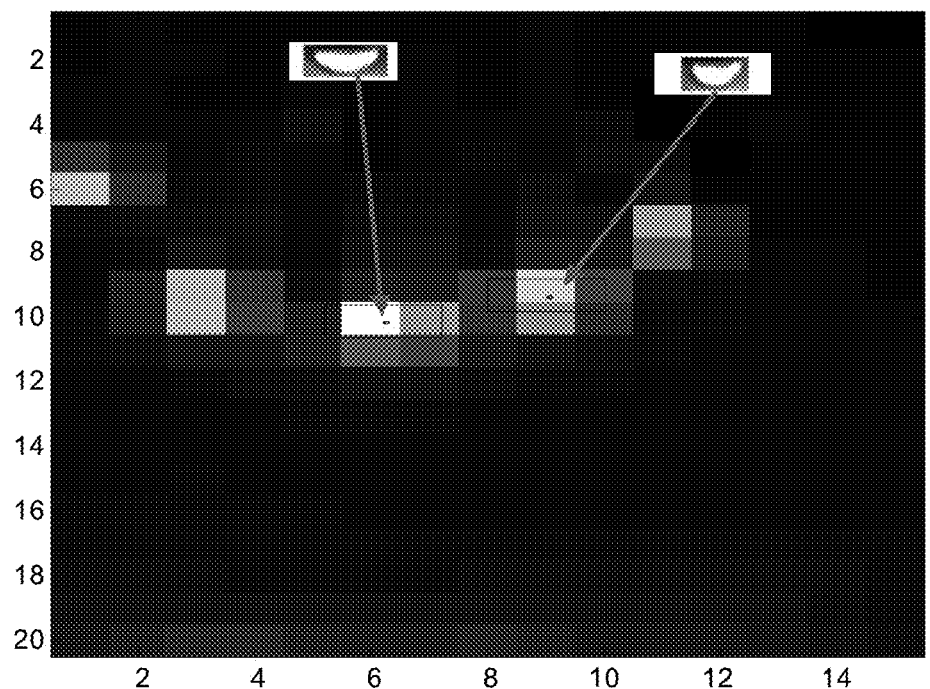

FIG. 3b illustrates an example such a coarse (decimated) grid. In the Figure the spots indicate the first estimation of the center-of-mass. We then take a 32×20 (say) grid around each of these. This is preferably used in conjunction with a differential approach to minimize noise, i.e. one frame laser on, next laser off.

Figure 3C:
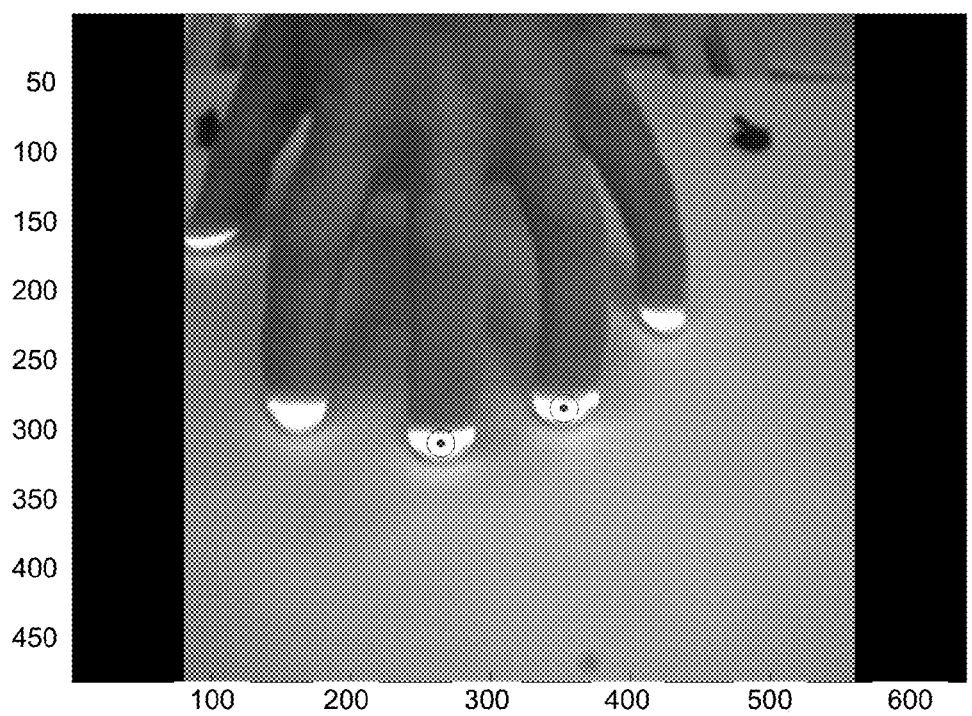

A centroid locator 310 (center of mass algorithm) is applied to the original (unthresholded) image in buffer 304 at each located peak, to determine a respective candidate finger/object location. FIG. 3c shows the results of the fine-grid position estimation, the spots indicating the finger locations found.

The system then applies distortion correction 312 to compensate for keystone distortion of the captured touch sense image and also, optionally, any distortion such as barrel distortion, from the lens of imaging optics 258. In one embodiment the optical axis of camera 260 is directed downwards at an angle of approximately 70° to the plane of the image and thus the keystone distortion is relatively small, but still significant enough for distortion correction to be desirable.

Because nearer parts of a captured touch sense image may be brighter than further parts, the thresholding may be position sensitive, alternatively position-sensitive scaling may be applied to the image in buffer 304 and a substantially uniform threshold may be applied.

In one embodiment of the crude peak locator 308 the procedure finds a connected region of the captured image by identifying the brightest block within a region (or a block with greater than a threshold brightness), and then locates the next brightest block, and so forth, preferably up to a distance limit (to avoid accidentally performing a flood fill). Centroid location is then performed on a connected region. In embodiments the pixel brightness/intensity values are not squared before the centroid location, to reduce the sensitivity of this technique to noise, interference and the like (which can cause movement of a detected centroid location by more than once pixel).

A simple center-of-mass calculation is sufficient for the purpose of finding a centroid in a given ROI (region of interest), and R(x,y) may be estimated thus:

$$x = \frac{\sum_{y_s=0}^{Y-1} \sum_{x_s=0}^{X-1} x_s R^n(x_s, y_s)}{\sum_{y_s=0}^{Y-1} \sum_{x_s=0}^{X-1} R^n(x_s, y_s)}$$

$$y = \frac{\sum_{y_s=0}^{Y-1} \sum_{x_s=0}^{X-1} y_s R^n(x_s, y_s)}{\sum_{y_s=0}^{Y-1} \sum_{x_s=0}^{X-1} R^n(x_s, y_s)}$$

where n is the order of the CoM calculation, and X and Y are the sizes of the ROI.

In embodiments the distortion correction module 312 performs a distortion correction using a polynomial to map between the touch sense camera space and the displayed image space: Say the transformed coordinates from camera space (x,y) into projected space (x',y') are related by the bivariate polynomial: x'=XC$_x$y$^T$x'=xC$_x$y$^T$ and y'=xC$_y$y$^T$; where C$_x$ and C$_y$ represent polynomial coefficients in matrix-form, and x and y are the vectorised powers of x and y respectively. Then we may design C$_x$ and C$_y$ such that we can assign a projected space grid location (i.e. memory location) by evaluation of the polynomial:

$$b = \lfloor x' \rfloor + X \lfloor y' \rfloor$$

Where X is the number of grid locations in the x-direction in projector space, and $\lfloor . \rfloor$ is the floor operator. The polynomial evaluation may be implemented, say, in Chebyshev form for better precision performance; the coefficients may be assigned at calibration. Further background can be found in our published PCT application WO2010/073024.

Once a set of candidate finger positions has been identified, these are passed to a module 314 which tracks finger/object positions and decodes actions, in particular to identity finger up/down or present/absent events. In embodiments this module also provides some position hysteresis, for example implemented using a digital filter, to reduce position jitter. In a single touch system module 314 need only decode a finger up/finger down state, but in a multi-touch system this module also allocates identifiers to the fingers/objects in the captured images and tracks the identified fingers/objects.

In general the field of view of the touch sense camera system is larger than the displayed image. To improve robustness of the touch sensing system touch events outside the displayed image area (which may be determined by calibration) may be rejected (for example, using appropriate entries in a threshold table of threshold module 306 to clip the crude peak locator outside the image area).

Pen Use

Embodiments of the invention which we describe later use a light signal from a touch object (pen) to provide additional touch information, for example an approximate position before (or after) the pen intersects the light sheet and/or a system to determine which region in a touch image corresponds to which pen. Any "pen" which provides a detectable signal usable to determine a position may be employed, for example a pen with continuous, pulsed, or coded (LED) light emission. In the later description we sometimes refer to a region in a touch image which corresponds to a touch object, such as a pen, as a "blob".

Figure 4A:
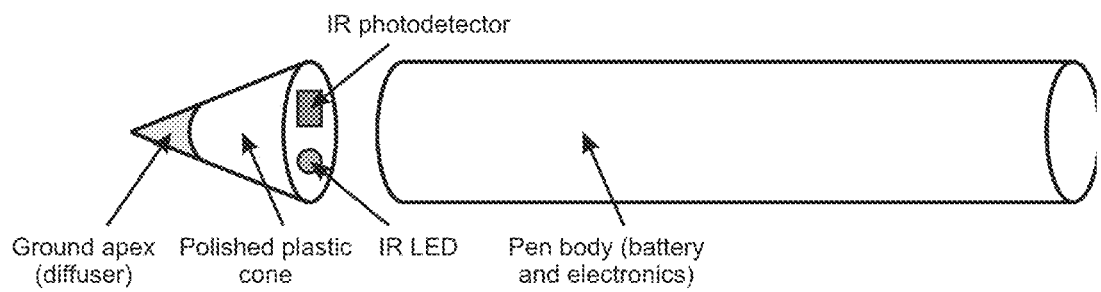
FIGS. 4a to 4c show example pens for use with a sheet of light-based touch sensing system.

A simple pen contains a battery, control electronics and an infra-red LED in the tip, which is turned on when the tip makes contact with the board. An improved, reduced power pen (as described, for example, in our PCT/GB2013/052386) add an infra-red sensitive photodiode to the tip which detects incident infra-red light (at wavelength $\lambda_1$), and activates an LED (also at $\lambda_1$) only if the detected incident IR light level is sufficiently high. To reject ambient light, the camera exposure period is set to be very short and the infra-red light sheet is pulsed in synchrony with the camera exposure. As a result, the tip LED activates in synchrony with the infra-red light sheet pulse train, reducing the duty cycle with no decrease in the signal intensity observed by the camera during its exposure period. An example of such a pen 450 is shown in FIG. 4a.

Instead of just illuminating the LED continuously during the camera exposure, a pulse pattern and/or pulse frequency can be employed within (or subsequent to) the exposure period to encode additional data to transmit data via an optical backchannel from the pen to an independent photo detector associated with the whiteboard. This additional data can encode, for example, a pen ID, or whether a button on the pen is pressed, to provide additional functionality including multi-pen discrimination.

An even simpler pen may dispense with the LED, battery and electronics and may be entirely passive, visible to the camera (and photo detectors described later) by the IR light from the touch sheet that the tip scatters. Such a passive pen may even be used to transmit coded signals back to the photodiodes, for example using a mechanical device to alter the scattering properties of the pen/pen tip (say by hiding/revealing/tilting a portion of the pen/tip).

Figure 4B:
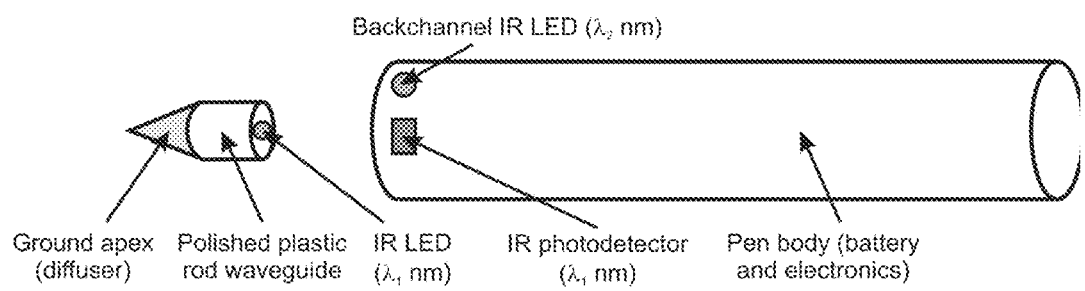
Figure 4C:
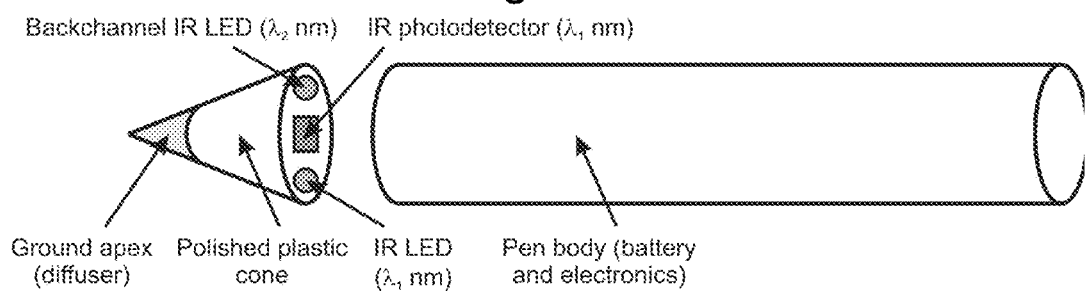

Additionally or alternatively, instead of the tip LED transmitting the optical backchannel pulse sequence, a second LED (or other signal source such as an RF emitter) can be employed to provide the backchannel—as shown for pens 452, 454 of FIGS. 4b and 4c. If the second LED has, for example, a different wavelength $\lambda_2$ from the tip LED ($\lambda_1$), the primary IR position signal (detected by the camera) and the optical backchannel (optionally detected by a separate photo detector) may be separated using appropriate dichroic filters, which can simplify the electronic design and improve robustness.

Figure 5:
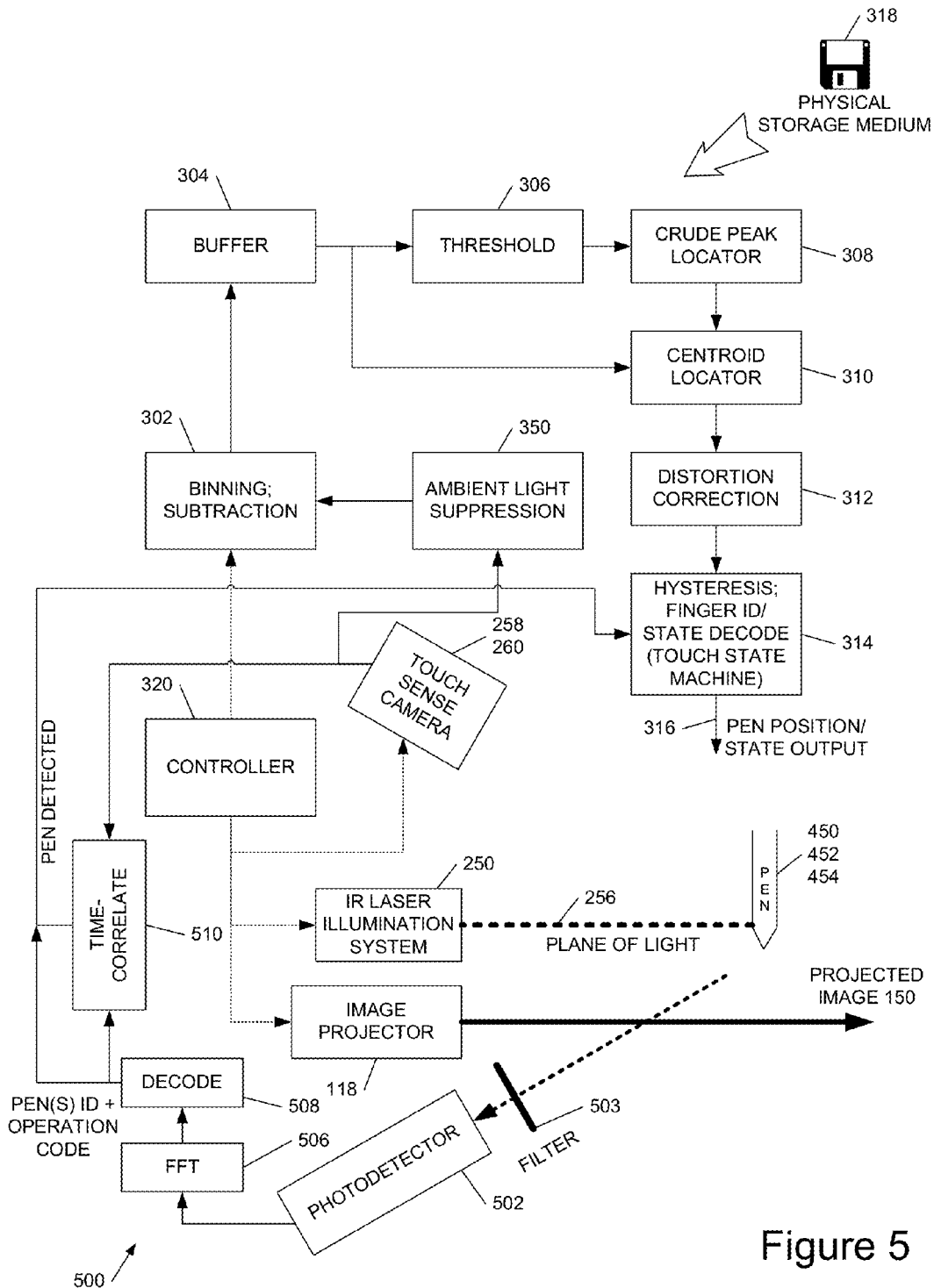
FIG. 5 shows a touch sensitive image display device configured to use the pen of FIG. 4.

FIG. 5 shows a touch detection system 500 with additional features to the block diagram of FIG. 3a for processing a signal from a pen of the type shown in FIG. 4. Thus a large area photo detector 502 is provided with a narrow band filter 503 to detect light from the LED backchannel of the pen or pens. This signal is converted into the frequency domain 506 and decoded 508 by identifying the one or more frequencies present to determine pen identifiers and/or pen states, for example a pen-down or pen-up signal. The decode module 508 provides a pen detected signal to the time-correlation block 510, indicatively in communication with touch sense camera 260, although in practice there are many points in the signal processing chain at which the correlation may be implemented (compensating for any processing delays as necessary). The time-correlation module 510 correlates a backchannel signal from the pen with identification of a new object in the captured touch sense image to provide a pen detected signal to the touch processing module (touch state machine) 314. In addition the pen ID/state information is also provided to the touch state machine to facilitate providing pen ID/state output data from the system.

Pen Modelling

Figure 6A:
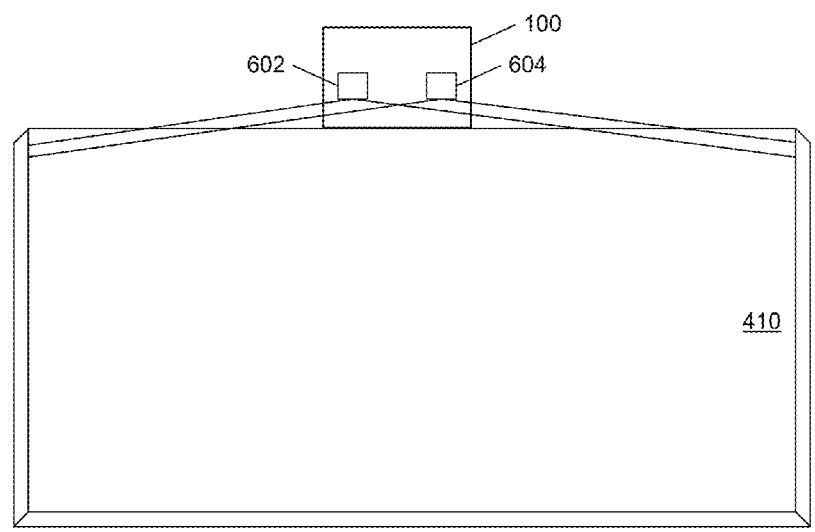

Referring to FIG. 6a, this shows an embodiment of a touch sensing system 600 according to the invention comprising a first touch sensing system employing a pair of photo detectors 602, 604 directed over the touch sensitive area 410, in combination with a sheet of light-based touch sensing system 100 which monitors the same touch sensing region. One or more pens, for example of the type illustrated in FIG. 4, is used with the system, which also detects non-pen touches, for example finger touches. Preferably each sensor sees substantially the whole of the touch surface; broadly speaking each sensor has a similar view.

The camera in the sheet of light-based touch sensing system 100 sees blobs of light corresponding to pens and fingers. Their positions in the camera image correspond straightforwardly to physical position. The two pen backchannel sensors measure (for each pen) two signal strength values. These vary with physical position, but in a more complicated manner.

In order to decide which camera-measured light blobs correspond to which pens, the system predicts what sensor values should arise from a pen in a given place, and when the measured sensor values are not precisely equal to those predicted for any of the candidate positions, how credible it is that given sensor values arise from a pen in a given place.

Predicted Signals

In one embodiment the system has two backchannel sensors. There is, however, no requirement to use two. In particular, as far as the calculation below is concerned one can treat each sensor separately. Further, the skilled person will appreciate that the particular form of the model described here is only one of many possibilities.

Suppose there is a pen at (x,y) and a sensor at (ξ, η) looking in direction α. Let the angle of the ray from sensor to pen be θ, so that the angle to the pen as seen from the sensor is θ−α, denoted φ. Write $d:\sqrt{(x-\xi)^2+(y-\eta)^2}$, the distance from sensor to pen.

Then the predicted signal seen by the sensor has the form $F(x,y)=g \cdot f_{dist}(d) \cdot f_{angle}(\varphi)$. Here g is the sensor gain; the two sensors may have different gains.

$f_{dist}$ describes how the signal falls off with distance; for almost any design of pen and sensor this will be $f_{dist}(d)=1/d^2$ or something very well approximated by this formula.

$f_{angle}$ describes the angular response of the sensor, and this depends strongly on the design of the sensor. The system can work fairly well with a wide variety of sensor designs (and hence different forms of $f_{angle}$). It is convenient if over much of its range $f_{angle}(\varphi)$ aφ+b is a good approximation. For the system we have described this is true, and for φ much outside this range of $f_{angle}$ is zero or very close to it. The skilled person will appreciate that the form of $f_{angle}$ may readily be adapted to other systems.

There may optionally be a fourth factor depending on the angle at which the pen is held, the brightness of its LEDs and the like. However, without having more than two backchannel sensors it is not convenient to model this.

Uncertainty of Prediction

Suppose we have an object at position (x,y) that we suspect of being a pen, and we have pen sensor signals $s_j=F_j(x,y)$; in a design with two sensors this means $s_1$, $s_2$. One can use the model described above to compute predicted signals $s_j$, but then the question arises, how should one compare the s's and S's to assess how reasonable it is to match up the measured and modeled signal strengths?

There are several sources of error that can make the s values not match the S values:

The position (x,y) is not perfectly accurate.

There is some noise in the sensor measurements.

The model embodied in the functions $F_j$ is a simplification and may not match reality.

The angle at which the pen is held, the details of its components may produce (roughly) variations in the gains g.

In practice, these various factors are reasonably well handled by the following heuristic treatment of the model. This assumes that there are two sensors, and that they are similar to one another, but this is not a limitation of the approach we describe.

Let $s_1, s_2$ to be the measured signal levels from the two sensors (the same reasoning holds for the modelled signals).

Then compute the following two quantities:

$$a = \log(s_1 + s_2), b = \frac{s_1 - s_2}{s_1 + s_2}.$$

It is then a tolerable approximation to suppose that the errors in a and b are independent normally distributed random variables. Typically the variance of a is much larger than that of b. It is not a bad approximation to suppose that these variances are constant over the whole range of valid positions, though a more sophisticated model could take account of the observation that b's variation with pen angle is greatly increased when the pen is near to the sensors.

This normal approximation means that if $s_1, s_2$ are the nominal predicted signals for a pen at (x,y) then the probability density at $(S_1, S_2)$ is approximated as $$\frac{1}{2\pi\sigma_a\sigma_b} \cdot \exp\left(-\left(\frac{A-a}{\sigma_a}\right)^2 - \left(\frac{B-b}{\sigma_b}\right)^2\right)$$

where a, b are the quantities obtained as above from $s_1$, $s_2$ and A, B are those obtained from $S_1$, $S_2$ and $\sigma_a, \sigma_b$ are the standard deviations estimated for those two quantities. As stated above one will typically take $\sigma_a > \sigma_b$ and one can also take both as independent of nominal position.

Assignment of pens or fingers to camera blobs may be performed using minimum-cost matching, implemented, for example, by the "Hungarian algorithm". It is then appropriate to take costs as logarithms of reciprocal probabilities, which means (with the assumption of constant $\sigma_a, \sigma_b$) that the cost is:

$$\left(\frac{A-a}{\sigma_a}\right)^2 + \left(\frac{B-b}{\sigma_b}\right)^2.$$

Figure 6B:
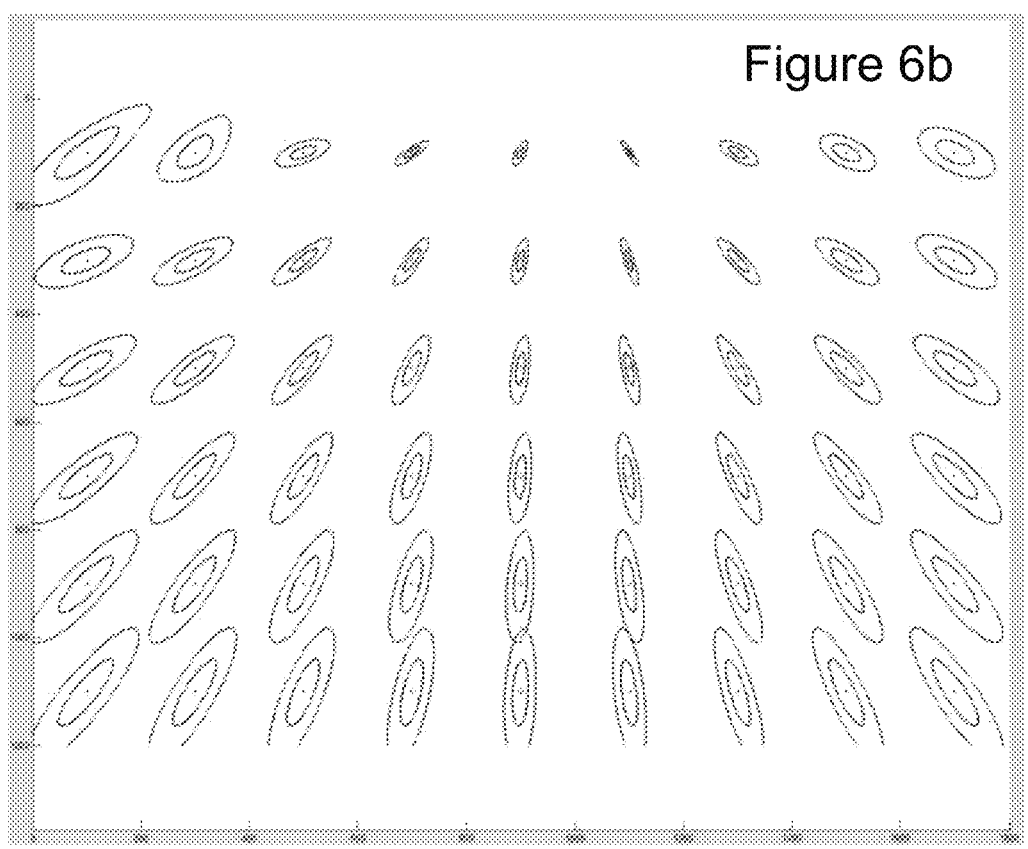

FIG. 6b below shows approximate 1-s.d. (standard deviation) and 2-s.d. curves for various pen positions on region 410 of FIG. 6a. The coordinates on the axes are in millimeters running from 0 to 1800 mm horizontally and from 0 to 1200 mm vertically. The sensors are near the top center of the region shown, as illustrated in FIG. 6a.

In one simple approach to matching pens to touch locations from the sheet of light touch sensing system, a threshold may be applied to a set of touch probabilities of the type shown in FIG. 6b (for a small number of pens), and then the system may step through each touch position checking whether for each, there is a matching touch detected by the two photo detectors. Unmatched locations may be assumed to be a finger. More precisely, in some embodiments, camera "blobs" and pen-backchannel signals are assigned, separately, to persistent tracks. In a refinement the system may step through all the candidate pairings to find the best matched pairings. In a more sophisticated approach a combinatorial optimization algorithm may be employed—for example the Kuhn-Munkres algorithm or "Hungarian" assignment algorithm may be used—see, for example, Wikipedia™.

Broadly speaking in such an approach a matrix of costs is constructed, of the type illustrated in FIG. 6c. In FIG. 6c m events are seen by the photo detector based touch sensing system and n events are seen by the second (sheet of light) touch sensing system, each event corresponding to a putative touch. The matrix is then populated by a set of matched costs, optionally separating situations where events can be paired and costs matched from touches seen by one system but not the other (costs unmatched). Any remaining portion of the matrix may be populated by zeros. The events are then matched to minimize the total costs by an assignment algorithm, such as the previously mentioned Hungarian algorithm.

Figure 6D:
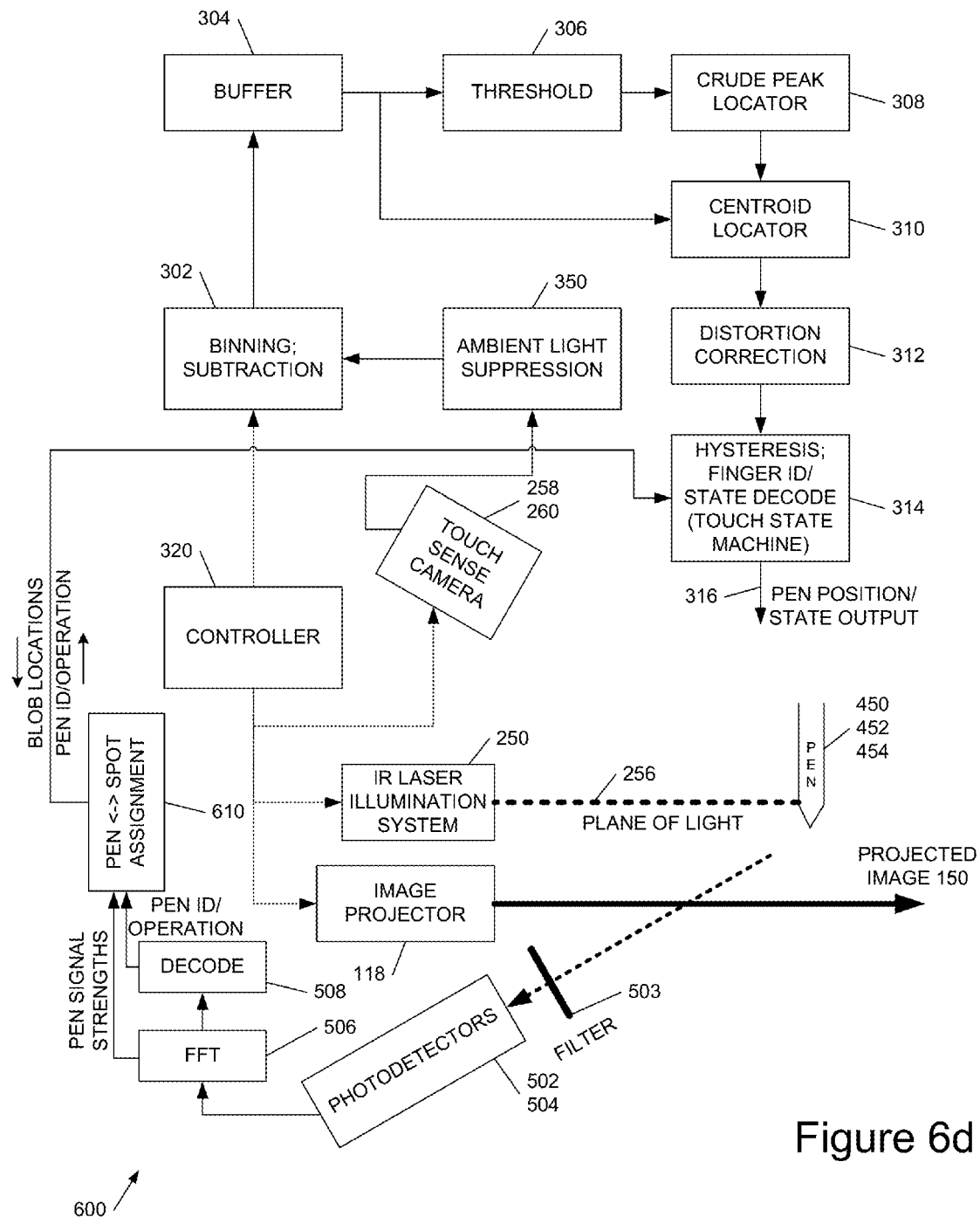

FIG. 6d shows processing in the touch sensing system 600, in which like elements to those of FIG. 5 are indicated by like reference numerals. Signals from photo detectors 602, 604 are decoded to identify pens/pen states (up/down) and this information and the received signal strengths from the pens used are provided to a pen to camera spot (blob) assignment module 610. Module 610 operates as described above, using spot location data from the camera image processing chain and providing data linking detected spots with pen identity/state data. The skilled person will appreciate that FIG. 6d shows one example implementation—again there are many points in the signal processing chain at which the assignment of pens to camera blobs may be performed.

Figure 7:
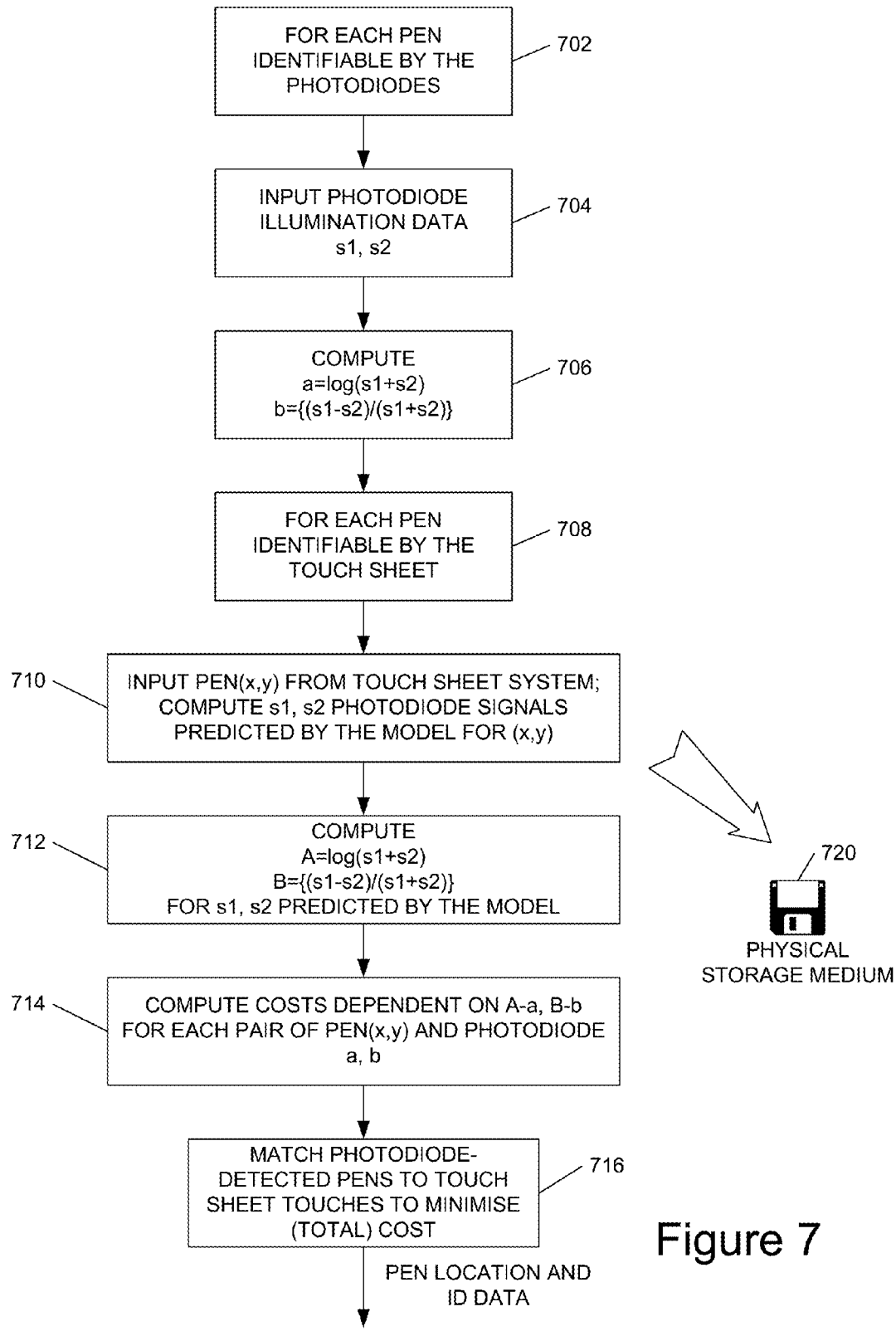
FIG. 7 shows a flow diagram of a signal processing procedure for the system of FIG. 6.

Referring now to FIG. 7, this shows a flow diagram of a procedure for determining which touch-sheet positions correspond to which pens. The procedure of FIG. 7 is illustrative; alternatives may be derived and the steps illustrated may be performed in a different order to that shown.

As illustrated, for each pen identifiable by the photodiodes (step 702) the procedure inputs 704 illumination data and computes 706 common mode and differential values, as illustrated values a and b described above. Then for each pen identifiable by the touch sheet (step 708) the system inputs 710 the touch position and computes photodiode signals predicted by the model for that location. The system then computes 712 corresponding common mode and differential signal values, as illustrated values for A and B described above, for the photodiode signals predicted by the model. The procedure then computes 714 costs for each pairing of photodiode-detected pen signals and touch sheet touch location. This data may then be used to populate a matrix of costs, for example as shown in FIG. 6c, and this may then be employed to associate 716 photodiode-detected pens with touch sheet touches, for example to minimize the total cost. This may be done by matching camera "blobs" and pen-backchannel signals or, as in some embodiments, each of these may be assigned, separately, to persistent tracks. Thus signals from pens may be linked to touches detected by the second (sheet of light) touch system to provide, for example, pen identification data in combination with pen location data. The skilled person will recognize that, more generally, other data relating to a pen may additionally or alternatively be linked with touches detected by the touch sheet system (for example a pen upstroke a pen down signal or the like).

Broadly speaking we have described a touch sensing system projecting light defining a touch sheet above a surface and a camera to capture a touch image of light scattered by a pen intersecting the touch sheet. A signal processor identifies a lateral location of the pen. The pen includes a light source to provide a light signal, and the system also includes two photodiodes to detect the signal from the pen. The touch detection is augmented by modelling the signals received at the photodiodes, dependent on the distance and angle of a pen, and using this to derive a probability of the observed received signals given the pen location determined from the touch sheet. This information can be used, for example, to allocate identities to the pens.

The techniques we have described are particularly useful for providing improved pen detection/identification in large touch-sensitive regions (say >0.5 m in one direction), for example for large touch-sensitive displays. Such displays may be based on any display technology including flat screen and projection technology. Thus the techniques we have described are particularly useful for an interactive electronic whiteboard, but also have advantages in smaller scale touch sensitive displays.

Although a sheet of light-based touch detection system has been described as an illustration of a embodiment of the second (accurate) touch sensing system the skilled person will recognize that in principle the approach described may be applied to enhance other types of In this specification we have referred to "pens" but, as mentioned, "pen" should be given a broad interpretation, covering any moveable device which can be used to indicate position. In general such a device will be handheld, but this is not essential: for example, it may comprise a magnetic object which is attached to a board or surface at a desired position, or an object which is moveably attached by some other means. The skilled person will appreciate that there is a very wide range of devices which may be employed as pens within the meaning given herein.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A method, in a touch sensing system, of determining location of a touch object, the method comprising:
   receiving first and second versions of a coded signal from the touch object at respective first and second detectors, the coded signal identifying the touch object determining a first location of the touch object based on the first and second versions of the coded signal and the identity of the touch object in the first and second versions of the coded signal determining a second locations for said touch objects using a further touch sensing system determining a correspondence between the first location and the second location; and augmenting said touch detection signal at the second location with, the identity of the touch object from the first location.

2. The method of claim 1 further comprising determining a property of said touch object dependent on a probability of receiving first and second versions of said signal at said first and second detectors given a location of said touch object in a touch sensing region of said system, wherein said probability is dependent on a model of variation of predicted first and second versions of said signal received at said detectors with location of said touch object.

3. A method as claimed in claim 1 comprising associating said second touch locations and said coded signals from said touch objects dependent on a cost or reward value for each said touch object dependent on said probability of said received first and second versions of said signal being from the second location of the touch object.

4. A method as claimed in claim 2 wherein said model comprises a function Predicted(x,y) dependent on $f_{dist}(d)$ where x and y define a 2D location in said touch sensing region, Predicted(x,y) is a predicted received version of said signal at one of said detectors, d is a distance from said touch object to said one of said detectors, and wherein $f_{dist}$ is a sensor-signal distance modeling function.

5. A method as claimed in claim 2 wherein said model comprises a function Predicted(x,y) dependent on $f_{angle}(\varphi)$ where x and y define a 2D location in said touch sensing region, Predicted(x,y) is a predicted received version of said signal at one of said detectors, and $\varphi$ is an angle between a fiducial direction and a direction between said touch object and said one of said detectors, and $f_{angle}$ is a respective sensor-signal angle modeling function.

6. A method as claimed in claim 2, wherein the first location is less accurate than said second location.

7. A method as claimed in claim 6 wherein said augmenting additionally comprises providing an approximate location for said touch object when said touch object is unseen by said further touch sensing system.

8. A method as claimed in claim 6 wherein said further touch sensing system further comprises a projection system to project light defining a touch sheet, and wherein said determining of a second location comprises imaging scattered light from said touch object intersecting said touch sheet.

9. A method as claimed in claim 6 wherein said further touch sensing system further comprises a projection system to project light defining a touch sheet, and wherein said determining of a second location comprises imaging scattered light from said touch object intersection said touch sheet.

10. A touch sensing system for determining the location of a touch object, the system comprising:
a first detection system for determining an accurate, first location of a touch object;
a second touch detection system, including first and second detectors to receive first and second versions of a coded signal, identifying the touch object, from said touch object for determining a less accurate, second location of the touch object; and a processor configured to:
determine a correspondence between the first location and the second location; and
augment the touch contact at the second location to identify the touch object.

11. A touch sensing system as claimed in claim 10 further comprising determining a property of said touch object dependent on a probability of receiving first and second versions of said signal at said first and second detectors given a location of said touch object in a touch sensing region of said system, wherein said probability is dependent on a model of variation of predicted first and second versions of said signal received at said detectors with location of said touch object; and using said determined property of said touch object to determine a location of said touch object wherein said processor is further configured to disambiguate identities of touch objects located by said first touch sensing system using said probability determined for said first location of said touch object.

12. A touch sensing system as claimed in claim 11 wherein said first touch sensing system comprises an imaging system, to locate said touch object by imaging light from said touch object.

13. A touch sensing system as claimed in claim 12 wherein said first touch sensing system comprises a projection system to project light defining a touch sheet and a processor to determine a first location of said touch object from an image of scattered light from said touch object intersecting said touch sheet.

14. A touch sensing system comprising:
a touch sensor optical system to project light defining a touch sheet above a surface;
a plurality of pens each providing a pen signal comprising a coded signal identifying said pen;
a camera directed to capture a touch sense image from a region including at least a portion of said touch sheet, said touch sense image comprising light scattered from said touch sheet by a pen approaching said surface;
a signal processor coupled to said camera, to process a said touch sense image from said camera to identify a lateral location of said pen on said surface and provide a touch detection signal for said pen including a location of said pen;
wherein the system further comprises at least two detectors, coupled to said signal processor, to detect said pen signal from said plurality of pens; and
wherein said signal processor is further configured to process detected pen signals from said detectors to augment said touch detection signal.

15. The touch sensing system of claim 14 wherein said signal processor is configured to determine probabilities of receiving first and second versions of said signal for pens identified by said coded signals using said lateral locations of said pens as said given locations; and wherein said signal processor is further configured to identify said pens at said lateral locations dependent on said determined probabilities.

16. A touch sensing system as claimed in claim 15 wherein said signal processor is configured to augment said touch detection signal by determining a location for said pen from said detected pen signals before said pen intersects said light sheet.

17. A touch sensing system as claimed in claim 15 comprising a plurality of said pens, wherein said pen signal comprises a coded signal identifying a pen, and wherein said signal processor is further configured to augment said touch detection signal by identifying a pen intersecting said light sheet.

18. A touch sensing system as claimed in claim 15 wherein said signal processor is configured to augment said touch detection signal by determining a property of said pen dependent on a probability of receiving first and second versions of said signal at said first and second detectors given said lateral location of said pen, wherein said probability is dependent on a model of variation of predicted first and second versions of said signal received at said detectors with location of said pen, wherein and said model comprises a function having the form: Predicted$(x,y)=f_{dist}(d) \cdot f_{angle}(\varphi)$ where x and y define said lateral location, Predicted(x,y) is a predicted received version of said signal at one of said detectors, d is a distance from said touch object to said one of said detectors, $\varphi$ is an angle between a fiducial direction and a direction between said touch object and said one of said detectors, and $f_{dist}$ and $f_{angle}$ are respective sensor-signal distance and sensor-signal angle modelling functions.

19. A touch sensing system as claimed in claim 15 wherein said signal processor is configured to identify said touch objects by associating said lateral locations and said coded signals from said pens dependent on a cost or reward value for each pen dependent on said probability of said received first and second versions of said signal being from the lateral location of the pen.

20. A touch sensing system as claimed in claim 15 wherein said cost or reward value is dependent on one or both of: a difference between predicted and received common mode signals from said detector, and a difference between predicted and received differential signals from said detectors.

* * * * *

UNITED STATES PATENT AND TRADEMARK OFFICE
CERTIFICATE OF CORRECTION

PATENT NO. : 9,886,105 B2
APPLICATION NO. : 14/578285
DATED : February 6, 2018
INVENTOR(S) : Gareth John McCaughan et al.

Page 1 of 1

It is certified that error appears in the above-identified patent and that said Letters Patent is hereby corrected as shown below:

In the Claims

At Claim 8, Column 15, Line 47, replace the words "wherein said further touch sensing system further comprises a projection system to project light defining a touch sheet, and wherein said determining of a second location comprises imaging scattered light from said touch object intersecting said touch sheet." with the words -- wherein said further touch sensing system comprises an imaging system, and wherein said determining of a second location comprises imaging light from said touch object. --.

Signed and Sealed this
First Day of May, 2018

Andrei Iancu
*Director of the United States Patent and Trademark Office*